United States Patent
Matsuda

(10) Patent No.: US 8,696,846 B2
(45) Date of Patent: Apr. 15, 2014

(54) METHOD OF MANUFACTURING A PNEUMATIC TIRE

(75) Inventor: Jun Matsuda, Hiratsuka (JP)

(73) Assignee: Yokohama Rubber Co., Ltd., Tokyo (JP)

( * ) Notice: Subject to any disclaimer, the term of this patent is extended or adjusted under 35 U.S.C. 154(b) by 981 days.

(21) Appl. No.: 11/794,691

(22) PCT Filed: Jan. 6, 2006

(86) PCT No.: PCT/JP2006/300056
§ 371 (c)(1),
(2), (4) Date: Jul. 3, 2007

(87) PCT Pub. No.: WO2006/075550
PCT Pub. Date: Jul. 20, 2006

(65) Prior Publication Data
US 2009/0205770 A1 Aug. 20, 2009

(30) Foreign Application Priority Data
Jan. 11, 2005 (JP) ................................ 2005-003770

(51) Int. Cl.
*B29D 30/30* (2006.01)
*B60C 5/14* (2006.01)

(52) U.S. Cl.
USPC .......... 156/133; 152/510; 156/87; 156/130.3; 156/134

(58) Field of Classification Search
USPC ......... 156/123, 133, 130.3, 134, 87; 152/510, 152/532
See application file for complete search history.

(56) References Cited

U.S. PATENT DOCUMENTS

| 4,052,246 A | * | 10/1977 | Albareda et al. ............... 156/412 |
| 4,325,423 A | | 4/1982 | Seitz et al. |
| 5,330,609 A | * | 7/1994 | Dreyer et al. .................. 156/421 |
| 5,618,374 A | * | 4/1997 | Byerley ......................... 156/418 |
| 5,851,323 A | * | 12/1998 | Kaido et al. .................. 152/510 |
| 5,938,869 A | | 8/1999 | Kaido et al. |
| 5,992,486 A | * | 11/1999 | Katsuki et al. ................ 152/510 |

(Continued)

FOREIGN PATENT DOCUMENTS

| JP | 58-134731 | 8/1983 |
| JP | 59-216704 | 12/1984 |
| JP | 4-182120 | 6/1992 |
| JP | 5-092498 | 4/1993 |

(Continued)

*Primary Examiner* — Geoffrey L Knable
(74) *Attorney, Agent, or Firm* — Greer Burns & Crain Ltd.

(57) ABSTRACT

The present invention provides a method of manufacturing a pneumatic tire, which can prevent an air pocket from being generated in a vicinity of a spliced portion of a sheet member (B) to be attached to an inner liner, even in the case of using, as the inner liner, a sheet member (A) made of a composition containing a resin component. The method includes a step of laminating a sheet member (A) and a sheet member (B) while being pressed on a making drum. The sheet member (B) is made of a rubber composition, and has two end portions in the circumferential direction overlapped and spliced with each other. In the method, a cut line of each end of the sheet member (B) in the circumferential direction has a vertex in the intermediate point in the width direction of the sheet member (B). Moreover, the cut line is displaced in the opposite direction to the rotational direction of the making drum as extending from the vertex to each of the right and left edges in the width direction.

4 Claims, 3 Drawing Sheets

(56) References Cited

U.S. PATENT DOCUMENTS

| | | | |
|---|---|---|---|
| 6,012,498 A * | 1/2000 | Koch | 152/197 |
| 6,105,647 A | 8/2000 | Champilou et al. | |
| 6,136,123 A | 10/2000 | Kaido et al. | |
| 6,354,349 B1 * | 3/2002 | Vannan, Jr. | 152/526 |
| 6,401,780 B1 * | 6/2002 | Patitsas et al. | 152/532 |
| 2005/0098252 A1 * | 5/2005 | Muraoka et al. | 152/510 |

FOREIGN PATENT DOCUMENTS

| | | |
|---|---|---|
| JP | 8-258506 | 10/1996 |
| JP | 11-005261 | 1/1999 |
| JP | 2000-501352 | 2/2000 |
| JP | 2002-12002 | 1/2002 |
| JP | 2002-080644 | 3/2002 |
| WO | WO 96/34736 | 11/1996 |
| WO | WO-98/56598 A1 * | 12/1998 |

* cited by examiner

METHOD OF MANUFACTURING A PNEUMATIC TIRE

TECHNICAL FIELD

The present invention relates to a method of manufacturing a pneumatic tire.

Specifically, the present invention relates to a novel method of manufacturing a pneumatic tire, the method being capable of manufacturing a pneumatic tire showing excellent characteristics especially in weight reduction and durability, when the pneumatic tire is manufactured using, as a material constituting a part of the pneumatic tire, a sheet member made of a composition containing a resin component.

The method of manufacturing a pneumatic tire of the present invention can prevent an air pocket from being generated in a vicinity of a spliced portion of a rubber sheet attached to an inner liner when a sheet member made of a composition containing a resin component is used as the inner liner, for example. The method thereby achieves the manufacturing of a high-performance pneumatic tire as described above.

Hereinafter, descriptions will be given of the present invention by especially taking, as an example, the case of manufacturing a pneumatic tire using, as an inner liner, a sheet made of a composition containing a resin component. It should be noted that the present invention is not limited to this case.

BACKGROUND ART

When a tubeless pneumatic tire is manufactured, an air-impermeable inner liner is attached to the inner wall surface of the tire. With this inner liner, the pressure of air filled in the tire is retained.

Heretofore, the inner liner has been generally made of a rubber material from the point of view that the rubber material has excellent adhesiveness to an adjacent layer.

Specifically, a layer to be adjacent to the inner liner is also generally made of a rubber material, while the adhesion between rubber materials is relatively good. For these reasons, the constituent material of the inner liner has also been formed of a rubber material. Among rubber materials, a butyl rubber has been frequently proposed and used as a material for the inner liner since the butyl rubber has excellent air impermeability.

However, the butyl rubber has a disadvantage in reducing the weight of a tire due to a large specific gravity.

In recent years, a method as follows has been proposed for the purpose of reducing the weight of a tire as much as possible by overcoming the disadvantage of the inner liner using a butyl rubber as described above. In the method, a thermoplastic resin composition in which a rubber component is combined with a thermoplastic resin is used as a material for the inner liner. (See Patent Document 1, for example)

However, in general, in the case of a member containing a resin component, the resin component sometimes reduces the adhesiveness of the member to another member made of rubber. For this reason, when a thermoplastic resin composition in which a rubber component is combined with a thermoplastic resin is used for the inner liner as the above-described proportion, the inner liner does not always adhere well to another rubber sheet which will be a layer adjacent thereto.

Accordingly, the following problem occurs in an actual process of manufacturing a pneumatic tire. Specifically, in the process, the inner liner and a rubber sheet whose end portions in the circumferential direction are overlapped and spliced with each other are laminated while being pressed with a stitch roller on a making drum. At this time, in a level difference portion formed in a portion where the splicing is performed, lamination and adhesion may not be perfectly performed along the shape of the level difference portion. As a result, an air pocket is likely to be generated in the level difference portion since the inner liner is detached and spaced from the rubber sheet.

The air pocket generated at the time of lamination and adhesion leads to the following problem. When an uncured tire is cured in the succeeding process in manufacturing a pneumatic tire, the air pocket expands due to thermal expansion. Then, when a vehicle runs with the tire having an expanded air pocket, the inner liner may be torn at the portion of the expanded air pocket. That is, the durability of the tire is decreased.

For this reason, a pneumatic tire having an air pocket is not marketed as a tire product.

Patent Document 1: Japanese Patent Application Kokai Publication No. 2002-80644.

DISCLOSURE OF INVENTION

An object of the present invention is to provide a novel method of manufacturing a pneumatic tire, the method being capable of preventing an air pocket in a vicinity of a spliced portion of a sheet member (B) attached to an inner liner, even in a case where a sheet member (A) made of a composition containing a resin component is used as the inner liner.

A method of manufacturing a pneumatic tire of the present invention includes the following configuration (1) for the purpose of achieving the above-described object.

(1) The method of manufacturing a pneumatic tire is characterized by including a step of laminating a sheet member (A) made of a composition containing a resin component and a sheet member (B), which is made of a rubber composition, and whose end portions in the circumferential direction are overlapped and spliced with each other, while being pressed on a making drum. In addition, the method is characterized in that a cut line of each end of the sheet member (B) in the circumferential direction has a vertex in the intermediate point in the width direction of the sheet member (B), and that the cut line is displaced in the opposite direction to a rotational direction of the making drum as extending from the vertex to each of the right and left edges in the width direction.

Moreover, the method of manufacturing a pneumatic tire of the present invention preferably includes any one of the following configurations (2) to (8) described in detail below.

(2) The method of manufacturing a pneumatic tire according to the above-described configuration (1) is characterized in that the composition containing the resin component is a thermoplastic resin composition containing a rubber component.

(3) The method of manufacturing a pneumatic tire according to any one of the above-described configurations (1) and (2) is characterized in that the sheet member (A) constitutes a tire inner liner.

(4) The method of manufacturing a pneumatic tire according to the above-described configuration (3) wherein the sheet member (B) is a tie rubber placed between the tire inner liner and a carcass layer.

(5) The method of manufacturing a pneumatic tire according to any one of the above-described configurations (1) to (4) is characterized in that the average angle of each of the cut lines with respect to the circumferential direction of the making drum is within the range from 20° to 80°.
(6) The method of manufacturing a pneumatic tire according to any one of the above-described configurations (3) to (5) is characterized in that the sheet member (B) is stacked as an air-impermeable layer on the inner side of the inner liner, and is made of a butyl rubber.
(7) The method of manufacturing a pneumatic tire according to any one of the above-described configurations (3) to (6) is characterized in that the inner liner is formed into a tube with no spliced portion formed thereon in the circumferential direction.
(8) The method of manufacturing a pneumatic tire according to any one of the configurations (1) to (7) is characterized in that the laminating step with pressure on the making drum is performed using a stitch roller.

BRIEF DESCRIPTION OF DRAWINGS

FIGS. 1(A) to 1(D) are process explanatory views for explaining, in order of steps, a laminating process in which sheet members (A) and (B) are used respectively as an inner liner and a tie rubber, to which process a method of manufacturing a pneumatic tire of the present invention is adopted, as an example of an embodiment of the method of manufacturing a pneumatic tire of the present invention.

FIG. 2 is a front view of a schematic model, which shows a state, on a making drum, of a vicinity of a spliced portion where end portions of the sheet member (B) are overlapped and spliced with each other while the sheet member (B) is wound around the making drum, in the example, which is described in FIG. 1, of the embodiment of the method of manufacturing a pneumatic tire of the present invention.

FIG. 3 is a cross-sectional view taken along the line X-X as viewed in a direction of the arrows, in the front view of the schematic model of FIG. 2 showing the state of the vicinity of the spliced portion on the making drum.

FIG. 4 shows, as an example of the embodiment of the method of manufacturing a pneumatic tire of the present invention, another embodiment in which the sheet members (A) and (B) are used respectively as the inner liner and the tie rubber, and also FIG. 4 is a front view of a schematic model, which shows a state of a vicinity of a spliced portion on a making drum, and which corresponds to FIG. 2.

FIG. 5 shows, as an example of the embodiment of the method of manufacturing a pneumatic tire of the present invention, still another embodiment in which the sheet members (A) and (B) are used respectively as the inner liner and the tie rubber, and also FIG. 5 is a front view of a schematic model, which shows a state of a vicinity of a spliced portion on a making drum, and which corresponds to FIG. 2.

DESCRIPTION OF THE REFERENCE NUMERALS

Figure 1:
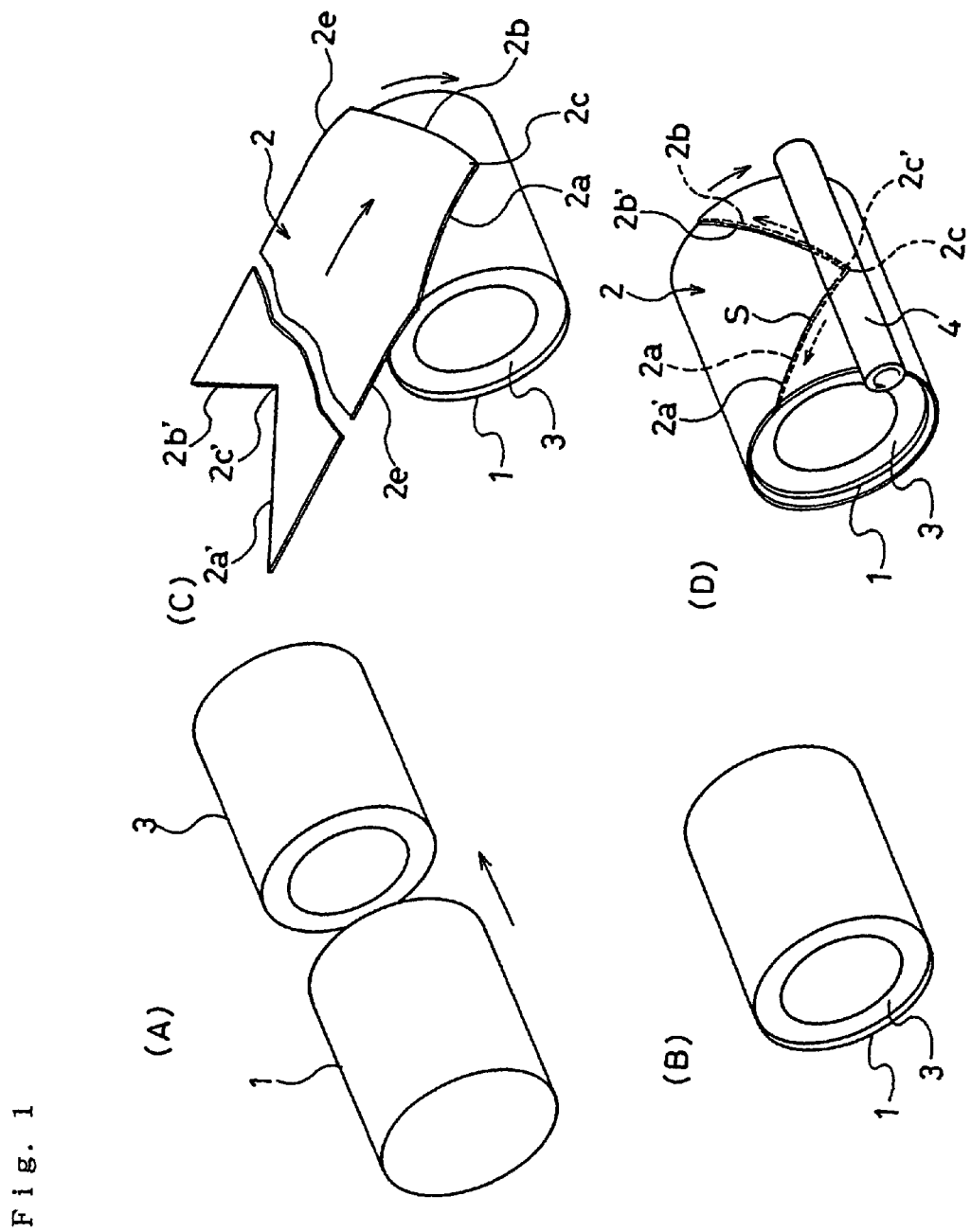
[FIG. 1]

1: Sheet member (A) (inner liner) made of composition containing resin component
2: Sheet member (B) (tie rubber)
3: Making drum
4: Stitch roller
2a, 2b; 2a', 2b': Cut lines on two end portions of sheet member (B) in circumferential direction
2c, 2c': Vertexes in two end portions of sheet member (b) in circumferential direction
2e: Edge
S: Spliced portion According to the present invention, the cut line of each end of the sheet member (B) is displaced in the opposite direction to the rotational direction of the making drum, as the cut line extends from the vertex in the intermediate point in the width direction of the sheet member (B) to each of the right and left edges in the width direction. The sheet member (A), such as the inner liner, made of a composition containing a resin component, and the sheet member (B), such as a tie rubber, are laminated while being pressed on the making drum with the stitch roller, for example. At this time, the pressing point of the stitch roller against the spliced portion of the sheet member (B) gradually moves from the vertex of the cut line as the starting point towards each of the outer side edges. The movement operation of the pressing point allows air in a level difference portion in the spliced portion to be gradually discharged from the vertex to the edges. As a result, it is possible to prevent an air pocket from being left in the vicinity of the spliced portion.

As a result, the present invention makes it possible to manufacture a pneumatic tire with no air pocket, that is, to manufacture an excellent pneumatic tire with a good balance between weight reduction and durability.

BEST MODE FOR CARRYING OUT THE INVENTION

Hereinafter, descriptions will be given of a method of manufacturing a pneumatic tire of the present invention with reference to an embodiment and the like shown in the accompanying drawings.

FIGS. 1(A) to 1(D) are process explanatory views for explaining a laminating process in order of steps, as an example of an embodiment of the method of manufacturing a pneumatic tire of the present invention. To the laminating process, a method of manufacturing a pneumatic tire of the present invention is adopted. In addition, in the laminating process, sheet members (A) and (B) are used respectively as an inner liner and a tie rubber.

In FIGS. 1(A) to 1(D), reference numeral 1 denotes an inner liner, which is to serve as a gas impermeable layer on the inner wall of a pneumatic tire, and which is an example of the sheet member (A) made of a composition containing a resin component. The inner liner 1 is formed into a tubular film of a thermoplastic resin composition containing a rubber component.

Reference numeral 2 denotes a tie rubber, which is to be placed between the inner liner 1 and a carcass, and which is an example of the sheet member (B).

Moreover, a making drum 3 and a stitch roller 4 are provided as a making machine. The surface of the stitch roller 4 is formed of an elastic rubber.

In this example, the laminating process for laminating the inner liner 1 and the sheet member 2 is implemented by using the making drum 3 and the stitch roller 4 as described below. Firstly, as shown in FIG. 1(A), the inner liner 1 is placed around the outer surface of the making drum 3 in a direction indicated by an arrow, so as to be in a state where the outer periphery of the making drum 3 is covered with the inner liner 1 as shown in FIG. 1(B).

Next, as shown in FIG. 1(C), the sheet member (tie rubber) 2 is drawn out of an unillustrated stock of the sheet member (tie rubber) B, and is cut into a predetermined length. Then, the cut sheet member 2 is wound around the making drum 3, which is covered with the inner liner 1.

The two end portions, in the circumferential direction, of the sheet member (tie rubber) 2 having been cut into the predetermined length include vertexes 2c and 2c', respectively, at the intermediate point in the width direction of the sheet member 2. In addition, cut lines 2a, 2b; 2a', 2b' extend respectively to the two edges 2e and 2e' from each of the vertexes 2c and 2c'. The cut lines 2a and 2b are displaced in the direction opposite to that in which the making drum 3 is rotated as extending from the vertex 2c to the edges on the right and left sides, respectively. In the same manner, the cut lines 2a' and 2b' are displaced in the direction opposite to that in which the making drum 3 is rotated of the making drum 3 as extending from the vertex 2c' to the edges on the right and left sides, respectively.

Since the cut lines are displaced, the cut lines 2a and 2b on the front end side in the winding direction form a convex shape, while the cut lines 2a' and 2b' on the back end side in the winding direction form a concave shape.

Figure 2:
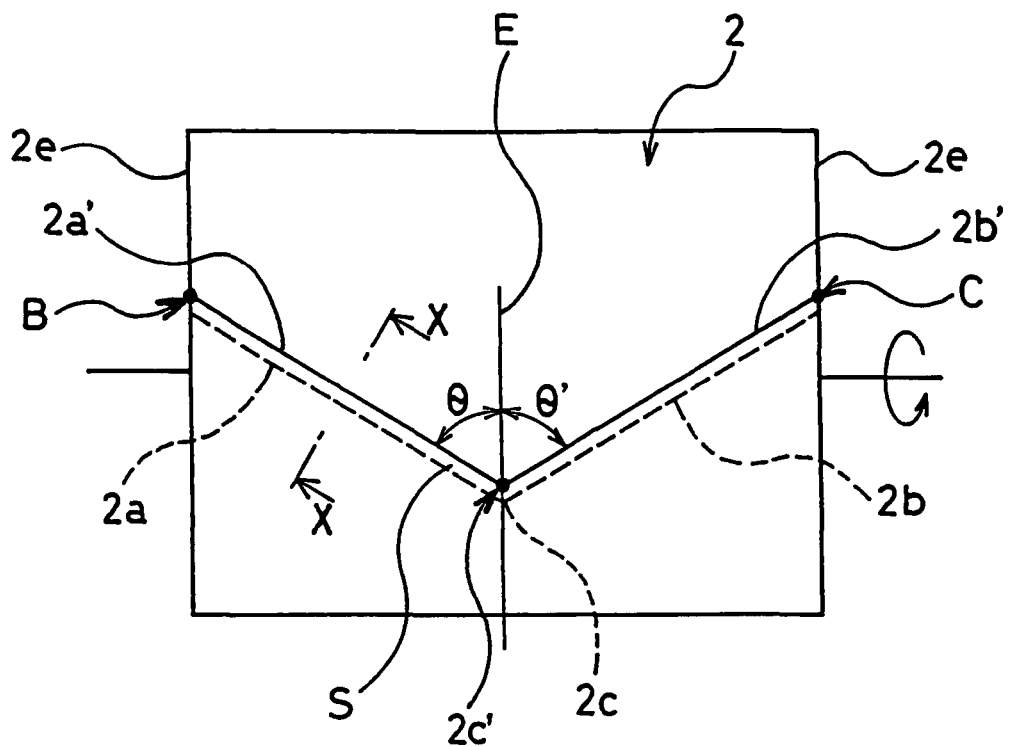
[FIG. 2]
Figure 3:
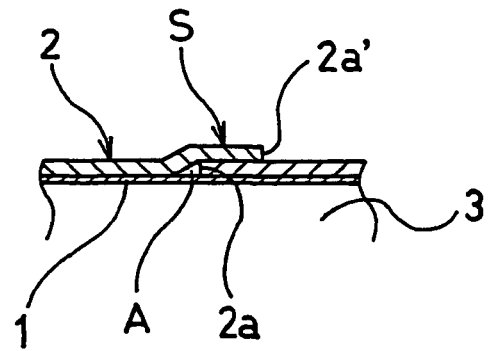
[FIG. 3]

The cut end portions of the sheet member 2 having 2a, 2b; 2a', 2b' formed in the two end portions in the circumferential direction, that is, the two end portions of the sheet member 2, are overlapped and then spliced with each other, as shown in FIG. 1(C). FIG. 2 is a front view of the making drum on which the end portions of the sheet member 2 are overlapped and spliced with each other, and on which a spliced portion S is thus formed. The spliced portion S forms a level difference as shown in FIG. 3, and an air pocket A is generated in the portion of the level difference.

After the end portions of the sheet member 2 are overlapped and spliced with each other as described above, the sheet member 2 is pressed with the stitch roller 4 while the making drum 3 is rotated in a direction indicated by an arrow as shown in FIG. 1(D). Accordingly, the inner liner 1 and the sheet member B (tie rubber) 2 adhere to each other so as to be laminated.

In the operation in the laminating process with the stitch roller 4 shown in FIG. 1(D), the vertexes 2c and 2c' in the spliced portion S are pressed with the stitch roller 4 at first. Thereafter, as indicated by dashed arrows, the spliced portion S is pressed from vertexes 2c and 2c' towards the edges 2e and 2e along the cut lines 2a, 2b; 2a', 2b'. Accordingly, the air pocket A moves towards the edges 2e and 2e along the cut lines 2a, 2b; 2a', 2b' while being continuously pressed down. Then, the air pocket A is gradually removed to the outside in the end. For this reason, it is possible to perform the making of a pneumatic tire while preventing an air pocket from being left in a vicinity of the spliced portion S.

In the present invention, the material of the sheet member (B) attached to the inner liner which is the sheet member (A) made of a composition containing a resin component is not limited to a tie rubber. Any other material may be adopted as long as the material is stacked to abut on the sheet member (A). For example, the sheet member (B) may be a rubberized carcass material used in a case where a carcass layer is directly attached to an inner liner. Otherwise, the sheet member (B) may be a sheet member made of a butyl rubber conventionally used in a case where the sheet member made of the butyl rubber is attached to the inner side of an inner liner made of a thermoplastic resin composition so as to be used as an air impermeable layer in combination with the inner liner.

In the present invention, the position of each vertex in the cut lines of the sheet member (B) may not necessarily be positioned at the intermediate point in the width direction of the sheet member. The position may be displaced on any one of the right and left sides with respect to the intermediate point in the width direction.

Figure 4:
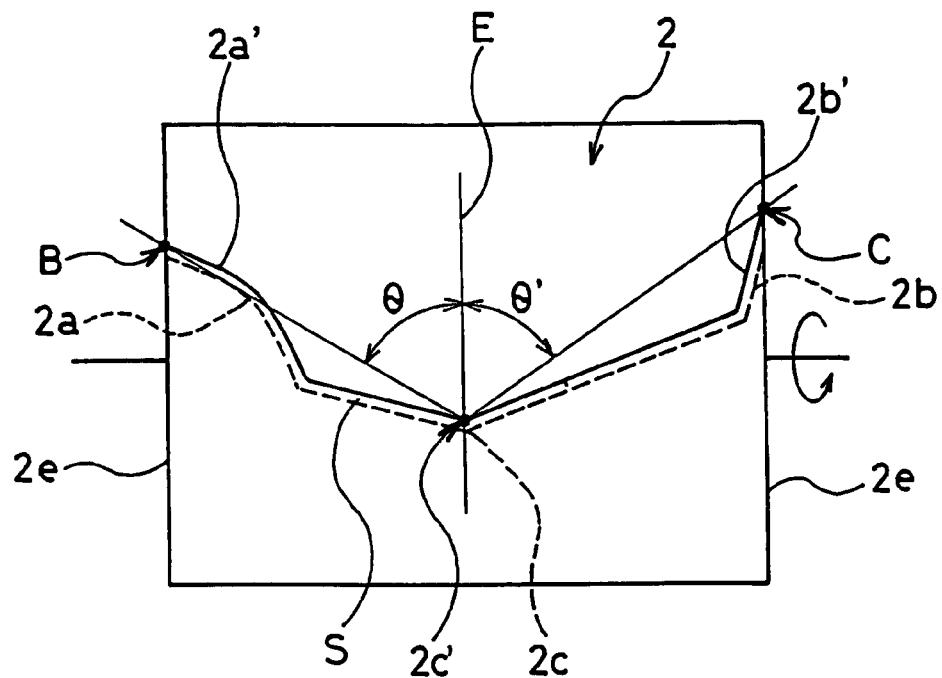
[FIG. 4]
Figure 5:
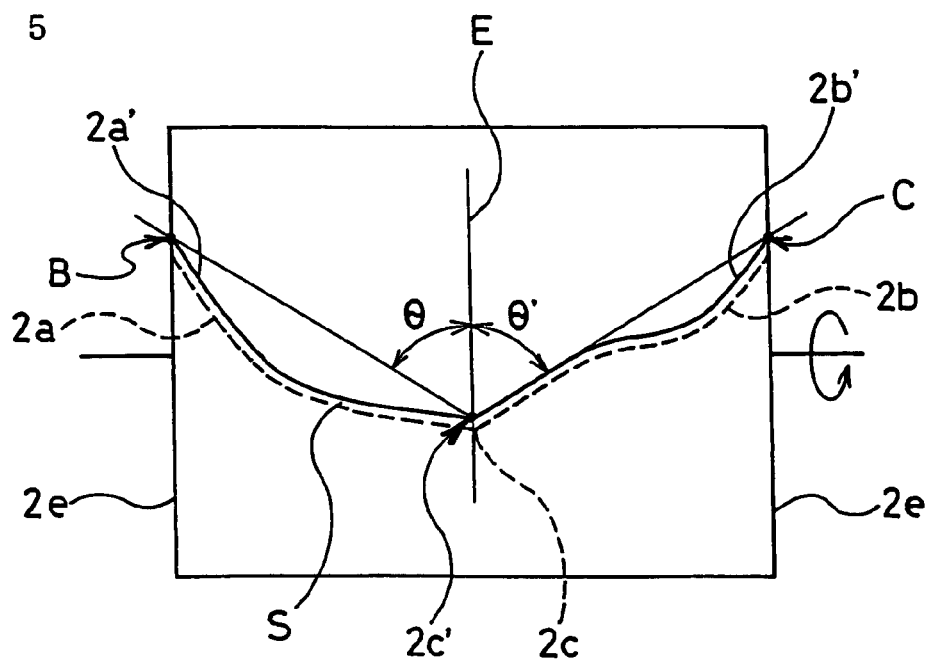
[FIG. 5]

Moreover, each cut line may not necessarily be linear as long as the cut line is displaced in the direction opposite to that in which the making drum is rotated as extending from a vertex to an edge. For this reason, each cut line may be a curved line or a broken line. In addition, as exemplified in FIGS. 4 and 5, each cut line may be a line in which at least two among a straight line, a curved line and a broken line are combined. In any case of these, by pressing the cut lines with the stitch roller while the making drum is rotated, air in the air pocket can be discharged to the outside of the edges.

In the present invention, the angle of each cut line, which extends from the vertex to the corresponding edge on each side in the circumferential direction, with respect to the circumferential direction E of the making drum is defined as the average angle $\theta$ or $\theta'$. The average angles $\theta$ and $\theta'$ on the right and left sides may be the same, or may be different from each other.

Each of the average angles $\theta$ and $\theta'$ is preferably within a range from 20° to 80°, and is more preferably within a range from 30° to 75°. When the average angle is smaller than 20°, the cut line extending from the vertex to the edge becomes very long. This results in an increase in the flow resistance of air at the time when the air is discharged. Accordingly, care should be taken since the air discharging effect may be decreased. When the average angle is larger than 80° which is close to a conventionally-adopted cut angle of 90°, care should be taken since the air discharging effect may be decreased.

Here, the average angle $\theta$ is defined as the angle of a line connecting the vertex 2c (2c') and the intersection point B where the corresponding cut line intersects the edge 2e with respect to the circumferential direction E of the making drum. Also, the average angle $\theta'$ is defined as the angle of a line connecting the vertex 2c (2c') and the intersection point C where the corresponding cut line intersects the edge 2e' with respect to the circumferential direction E of the making drum.

Even in a case where a cutting line in each end portion of the sheet member (B) in the circumferential direction is configured to be displaced simply from one edge to the other edge in the width direction of the sheet member (B), the pressing point of the stitch roller against the spliced portion moves from that one edge to the other edge. Accordingly, it is possible to, at least, discharge air in the level difference by pressing the air from that one edge toward the other edge. However, in this case, the length of the air passage is at least twice that of a case where air is discharged through two separate air passages extending from the vertex at the intermediate point in the width direction of the sheet member (B) as in the case of the present invention. This means that the flow resistance is increased. Accordingly, this configuration is not preferable since the air discharging effect is decreased.

In the present invention, as the above-described inner liner used as the sheet member (A), such an inner liner formed into a tube with no spliced portion formed thereon in the circumferential direction as exemplified in FIG. 1(A) is most effectively used, since this makes it possible to preferably produce the above-described effects of the present invention.

What is claimed is:

1. A method of manufacturing a pneumatic tire having a first sheet member, an adjacent second sheet member, and a carcass, the method comprising:
   placing the first sheet member, made of a composition containing a resin component and having no splice, around the outer surface of a making drum such that the first sheet member has no splice after the first sheet member is applied to the drum;
   cutting the second sheet member to a predetermined length, the second sheet member being made of a rubber composition, the second sheet member having a front end portion and a back end portion, where each end portion has a cut line with a vertex, and where the cut lines on the front end portion form a convex vertex and the cut lines on the back end portion form a concave vertex;

placing the front end portion with the convex vertex of the second sheet member on the making drum covered with the first sheet member;

wrapping the second sheet member around the making drum in the circumferential direction;

overlapping and splicing the two end portions of the second sheet member so that the convex vertex and the concave vertex overlap;

pressing the first sheet member and the second sheet member together by rotating the making drum in the circumferential direction;

discharging air from the splice from the overlapping vertices toward outer edges of the second sheet members, and applying the carcass after splicing;

wherein an average angle of each of the cut lines with respect to the circumferential direction of the making drum is within the range from 20° to 80°, wherein the first sheet member constitutes a tire inner liner, and the second sheet member is a tie rubber placed between the tire inner liner and the carcass.

2. The method of manufacturing a pneumatic tire according to claim 1 wherein the composition containing the resin component is a thermoplastic resin composition containing a rubber component.

3. The method of manufacturing a pneumatic tire according to claim 1 wherein the first sheet member and the second sheet member are pressed together with pressure on the making drum using a stitch roller.

4. A method of manufacturing a pneumatic tire having a first sheet member, an adjacent second sheet member, and a carcass, the method comprising:

placing the first sheet member, made of a composition containing a resin component and having no splice, around the outer surface of a making drum such that the first sheet member has no splice after the first sheet member is applied to the drum;

cutting the second sheet member to a predetermined length, the second sheet member being made of a rubber composition, the second sheet member having a front end portion and a back end portion, where each end portion has a cut line with a vertex, and where the cut lines on the front end portion form a convex vertex and the cut lines on the back end portion form a concave vertex;

placing the front end portion with the convex vertex of the second sheet member on the making drum covered with the first sheet member;

wrapping the second sheet member around the making drum in the circumferential direction;

overlapping and splicing the two end portions of the second sheet member so that the convex vertex and the concave vertex overlap;

pressing the first sheet member and the second sheet member together by rotating the making drum in the circumferential direction;

discharging air from the splice from the overlapping vertices toward outer edges of the second sheet members, and applying the carcass after splicing;

wherein an average angle of each of the cut lines with respect to the circumferential direction of the making drum is within the range from 20° to 80°, wherein the first sheet member constitutes a tire inner liner, and wherein the second sheet member is stacked as an air-impermeable layer on the inner side of the inner liner, and is made of a butyl rubber.

\* \* \* \* \*